(12) United States Patent
Morise et al.

(10) Patent No.: US 6,679,445 B2
(45) Date of Patent: Jan. 20, 2004

(54) SPOOL FOR SPINNING REEL

(75) Inventors: Taisei Morise, Sakai (JP); Ken'ichi Sugawara, Sakai (JP)

(73) Assignee: Shimano Inc., Osaka (JP)

( * ) Notice: Subject to any disclaimer, the term of this patent is extended or adjusted under 35 U.S.C. 154(b) by 3 days.

(21) Appl. No.: 10/038,809

(22) Filed: Jan. 8, 2002

(65) Prior Publication Data

US 2002/0088889 A1 Jul. 11, 2002

(30) Foreign Application Priority Data

Jan. 10, 2001 (JP) ........................................ 2001-002566
Jan. 10, 2001 (JP) ........................................ 2001-002567
Jan. 24, 2001 (JP) ........................................ 2001-015599

(51) Int. Cl.[7] ............................................. A01K 89/01
(52) U.S. Cl. ..................................................... 242/322
(58) Field of Search ................................. 242/322, 224

(56) References Cited

U.S. PATENT DOCUMENTS

| | | | | |
|---|---|---|---|---|
| 3,186,656 A | * | 6/1965 | Venable | 242/321 |
| 4,222,534 A | * | 9/1980 | Ishida | 242/322 |
| 4,771,964 A | * | 9/1988 | Watanabe et al. | 242/250 |
| 5,697,567 A | * | 12/1997 | Sonenvald | 242/322 |
| 5,785,266 A | * | 7/1998 | Bowersox | 242/323 |
| 5,875,986 A | * | 3/1999 | Miyazaki et al. | 242/261 |
| 6,164,578 A | * | 12/2000 | Tsutsumi | 242/322 |
| 6,286,772 B1 | * | 9/2001 | Koelewyn | 242/246 |
| 6,431,483 B2 | * | 8/2002 | Takikura et al. | 242/322 |

FOREIGN PATENT DOCUMENTS

JP          2001-275533 A         10/2001

\* cited by examiner

*Primary Examiner*—Emmanuel M Marcelo
(74) *Attorney, Agent, or Firm*—Shinjyu Global IP Counselors. LLP

(57) ABSTRACT

Spool for a spinning reel for line-winding, fitted onto the fore end portion of a spool shaft that pumps back and forth with respect to a reel unit, is furnished with a bobbin trunk, a front flange and flange-fastening member. The bobbin trunk is fitted onto the fore end portion of the spool shaft. The front flange includes a first flange portion, which is formed integrally into a brim encompassing the fore end of the bobbin trunk, and a ring-shaped second flange portion fitted removably and reattachably onto the outer periphery of the first flange portion and made of a hard material. The flange-fastening member fastens the second flange portion onto the first flange portion.

22 Claims, 12 Drawing Sheets

SPOOL FOR SPINNING REEL

BACKGROUND OF THE INVENTION

1. Field of the Invention

This invention generally relates to spools. More specifically, among spinning reels, the present invention relates to line-winding spools fitted to the fore end of the spool shaft that reciprocates with respect to the body.

2. Background Information

Spinning reels are generally furnished with a reel body that attaches to a fishing rod; a line-winding spool fitted to the fore end of a spool shaft that pumps back and forth with respect to the reel body; and, fitted rotatively to the reel body, a rotor for winding fishing line onto the spool. Spinning-reel spools of this sort include a bobbin trunk onto which fishing line is wound, a skirt larger in diameter than and formed unitarily on the rear end of the bobbin trunk, and a front flange provided on the front end of the bobbin trunk.

To serve to lighten the weight of the bobbin trunk and skirt, light-metal manufacturing materials such as aluminum alloys and magnesium alloys are used. Meanwhile, because the front flange is subject to wearing and scratching by the fishing line rubbing on the outer periphery when the fishing line is reeled out, in some cases the front flange is provided as a ring-shaped member separate from the bobbin trunk. In situations in which the front flange and the bobbin trunk are made separate members, taking durability and wear resistance into consideration, a rigid material, e.g., a hard metal such as stainless steel or a hard ceramic such as zirconia, has been used in the past for the front flange.

The relative density of hard materials such as stainless steel and zirconia generally is large. Therefore, being that the front flange is produced from a hard material in the foregoing conventional spools, designing the spool to be lightweight overall is difficult even though the bobbin trunk and the skirt are lightened. Particularly in the case of standard type spools whose front-flange outer diameter is large relative to the outer diameter of the bobbin trunk, the fact that the inner/outer diametric difference of the ring-shaped front flange is large means that the bulk of the front flange is large and leads to weight increase in the spool.

In view of the above, there exists a need for spinning reel spool which overcomes the above mentioned problems in the prior art. This invention addresses this need in the prior art as well as other needs, which will become apparent to those skilled in the art from this disclosure.

SUMMARY OF THE INVENTION

One object of the present invention is to provide the spool in spinning reels as lightweight as possible while maintaining wear resistance and durability in the spool front flange.

A spinning-reel spool in a first aspect of the present invention is fitted onto the fore end of a spool shaft that reciprocates back and forth relative to the reel body of the spinning reel, for line-winding, and includes a bobbin trunk, a front flange, and a flange-fastening member. The bobbing trunk is fitted onto the fore end of the spool shaft. The front includes a first flange portion provided as a brim encompassing the front end of the bobbin trunk, and a ring-shaped second flange portion fitted removably and reattachably onto the outer periphery of the first flange portion and made of a hard material whose relative density is larger than that of the bobbin trunk and the first flange. The flange-fastening member is a component for fastening the second flange portion onto the first flange portion.

The first flange portion among the front-flange portions of this spool is provided on the bobbin trunk, and the second flange portion, whose relative density is larger than that of the bobbin trunk and the first flange portion, is made as a separate component from the first flange portion. This serves to lighten the first flange portion together with the bobbin trunk. The outer peripheral part of the front flange is what the fishing line principally rubs on during line reel-out; providing a second flange made of a hard material removably and reattachably on that part therefore also prevents scratching and wear in the outer peripheral area. Herein, the fact that the front flange is divided into two sections—the second flange portion, manufactured of a hard material whose relative density is large, arranged on the outer peripheral area prone to scratching where the fishing line rubs; and the first flange portion, whose relative density is small, arranged in the remaining inner peripheral area—maintains wear resistance and durability in the front flange, and lightens the spool as much as can be.

The spinning-reel spool in a second aspect of the present invention is a spool as set forth in the first aspect, wherein the first flange portion is formed unitarily with the bobbin trunk. In this case, the fact that the first flange portion and the bobbin trunk are formed unitarily serves to lighten the weight; the unitary formation also keeps the strength of the first flange portion high.

The spinning-reel spool in a third aspect of the present invention is a spool as set forth in the first or second aspect, further including a skirt larger in diameter than the bobbin trunk and formed unitarily with the bobbin-trunk rear end. In this case, the skirt is, together with the bobbin trunk, designed to be lightweight.

The spinning-reel spool in a fourth aspect of the present invention is a spool as set forth in the first or second aspect, wherein the outer diameter of the first flange portion is larger than the mid-value between the outer diameter of the second flange portion and the outer diameter of the bobbin trunk. Because in this case the outer diameter of the inward first flange portion is more than the mid value with respect to the outer-diametric difference in the front flange portions totally, the proportion of the entire front flange that the first flange portion occupies is larger, facilitating lightweight design of the spool overall.

A spinning-reel spool in a fifth aspect of the present invention is a spool as set forth in the fourth aspect, wherein the difference between the inner diameter and the outer diameter of the second flange portion is 3 mm–25 mm. An inner-outer diametric difference of less than 3 mm would make the second flange portion too narrow and of insufficient strength. Again, in excess of 25 mm the proportion of the front flange overall that a large relative-density second flange portion would occupy would be great; and the entire spool would be oversized, leading to weight increase in the spool overall.

A spinning-reel spool in a sixth aspect of the present invention is a spool as set forth in the first or second aspect, wherein the first flange portion has a fillet section that in cross-section in the spool axial direction becomes nearly rectilinear. In this case, the nearly rectilinear fillet section makes the outer diameter of the first flange portion larger, further lightening the spool.

A spinning-reel spool in a seventh aspect of the present invention is a spool as set forth in the first or second aspect, wherein the flange-fastening member is fastened by screwing into the inner peripheral surface of the bobbin trunk. In this case, because the flange-fastening member is fastened by screwing into the bobbin trunk, the second flange portion is pressed uniformly, as opposed to a configuration in which the flange-fastening member is held fast by screws. Further, the fact that the second flange portion may be fastened just by twisting in the flange-fastening member makes attaching/removing the second flange portion easy.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Overall Configuration

Figure 1:
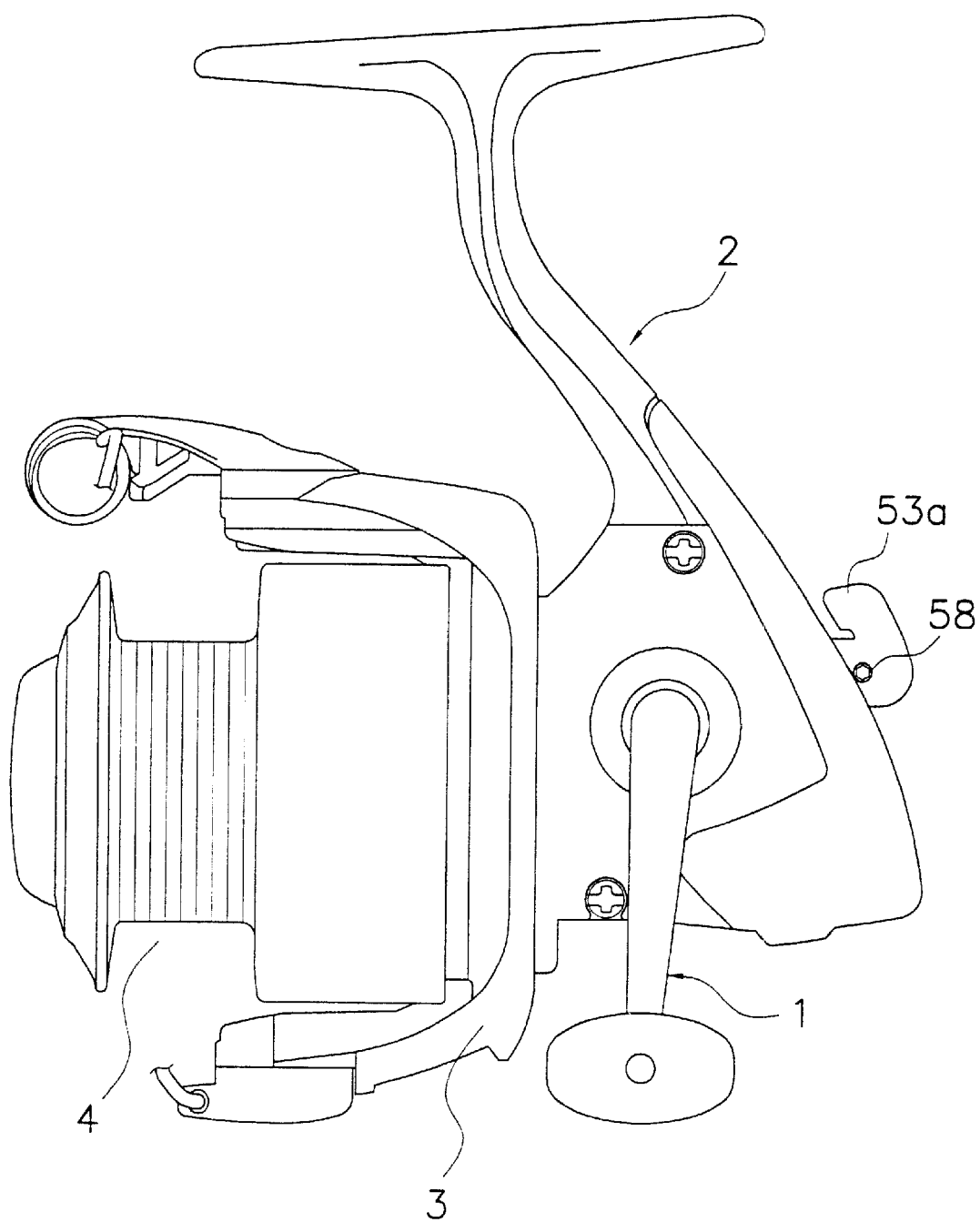
FIG. 1 is a left-side view of a spinning reel according to one embodiment of the present invention.
Figure 2:
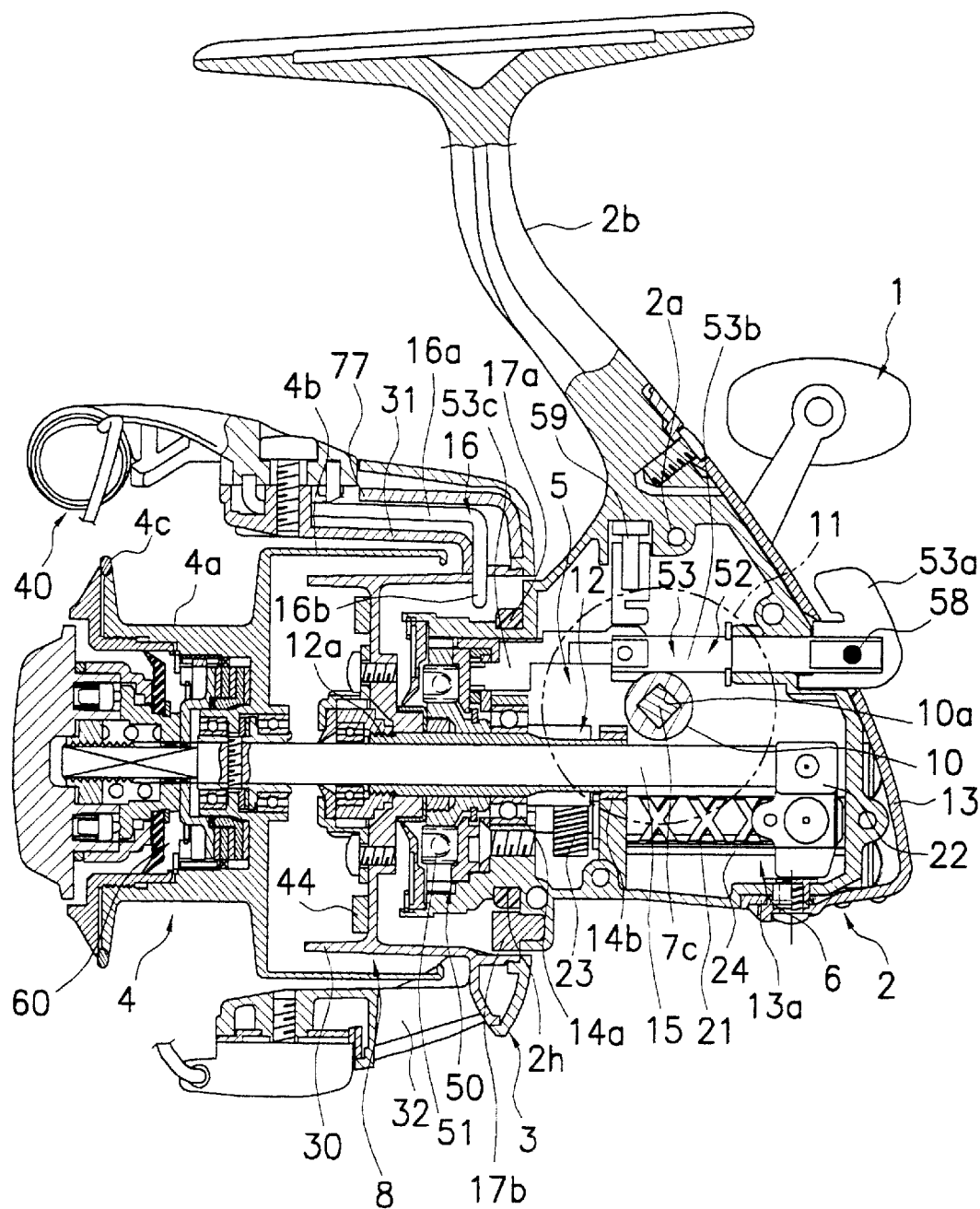
FIG. 2 is a left-side cross sectional view of the spring reel.

As seen in FIGS. 1 and 2, a spinning reel in which one embodiment of the present invention is adopted is furnished with: a reel unit 2 that is attachable to a fishing rod; a handle assembly 1 fitted to rotate around a left/right shaft in the reel unit 2; a rotor 3; and a spool 4. The handle assembly 1 can be fitted to the left shaft as shown in FIG. 1, or the right shaft as shown in FIG. 2. The rotor 3 had a bail arm 40 that is pivotable between a line-releasing posture and a line-retrieving posture, and rotates in accordance with rotation of the handle assembly 1 to guide fishing line onto the spool 4. The rotor 3 is carried in the front of the reel unit 2 rotatively about a front-to-rear shaft. The spool 4 winds fishing line guided by the rotor 3 onto its outer circumferential surface, and is disposed on the front of the rotor 3 reciprocatingly in the front-rear axial direction.

Reel Unit Configuration

Figure 3:
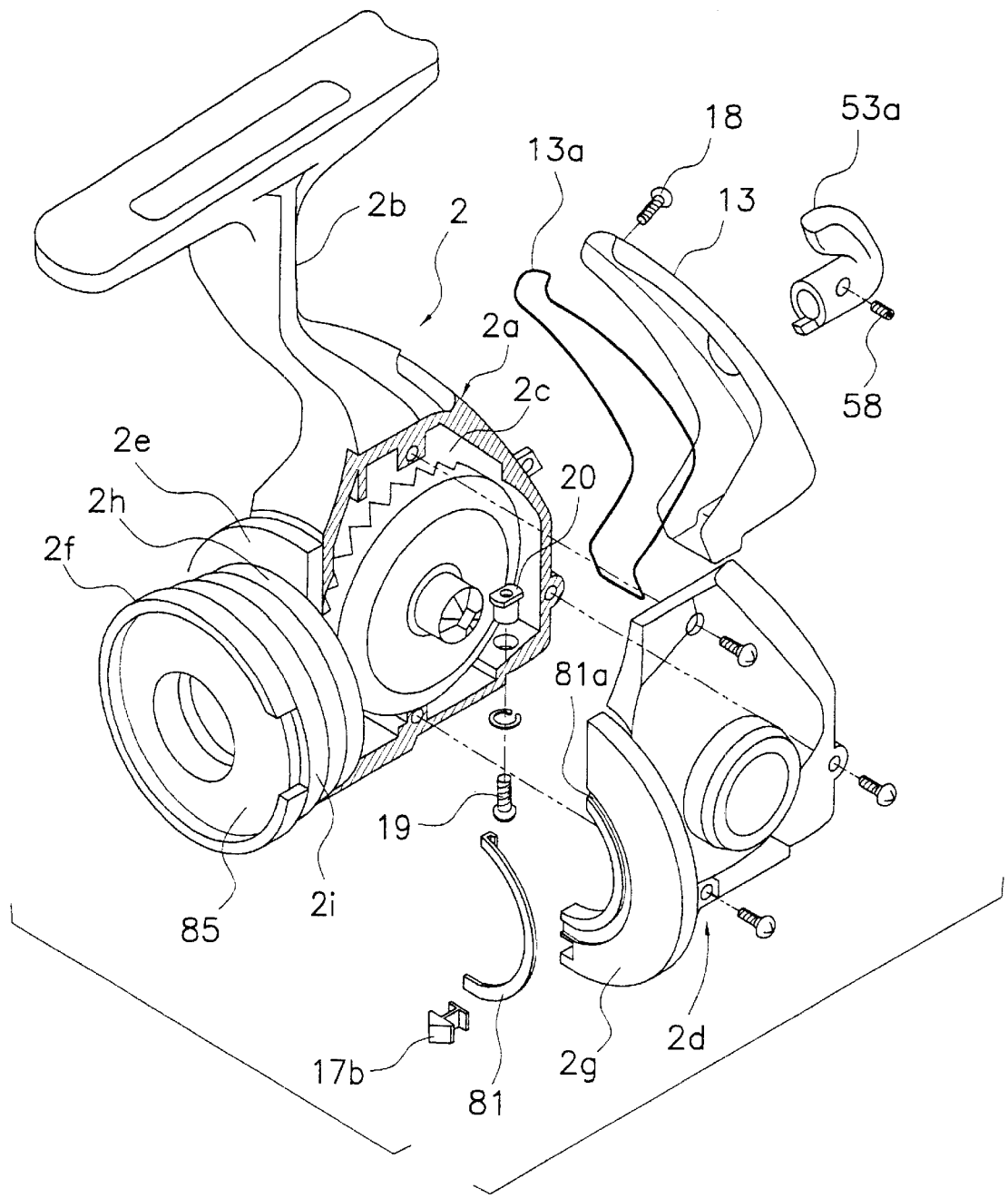
FIG. 3 is an exploded perspective view of the reel unit.

The reel unit 2, as shown in FIG. 3, includes: a magnesium-alloy manufactured reel body 2a composing the chief part of the reel unit 2 and having a lateral aperture 2c; a T-shaped rod-mounting leg 2b extending diagonally up/frontward from and integrally with the reel body 2a; and a magnesium-alloy manufactured cover member 2d screwed fast to the reel body 2a so as to shut the aperture 2c. An anodized coating is formed on the surfaces of the reel body 2a, rod-mounting leg 2b and cover member 2d, and over it a paint-film layer is further formed.

A mechanism-mounting space stands into the reel body 2 from the aperture 2c, and installed in within the space are, as shown in FIG. 2: a rotor-drive mechanism 5 that rotates the rotor 3 by linkage to rotation of the handle assembly 1; an oscillating mechanism 6 that pumps the spool 4 back and forth to wind fishing line onto it uniformly; and a linking mechanism 7 that links the rotor-drive mechanism 5 and the oscillating mechanism 6.

As shown in FIG. 3, a first flange portion 2e, and a cylindrical portion 2f projecting forward from the first flange portion 2e are formed on the front of the reel body 2a. The first flange portion 2e has an approximately semicircular contour as though missing a section consisting of a chord and a circular arc, and is formed standing on the front end of the aperture 2c. The cylindrical portion 2f is a circular cylindrical section that shrinks diametrically in three graduated steps. As shown in FIG. 2, in the interior of the cylindrical portion, a one-way clutch 51 of an anti-reverse mechanism 50 is mounted for prohibiting and releasing the prohibition of rotation (reversal) of the rotor 3 in the line reel-out direction. A notch 2i (FIG. 3) is formed in the front rim of the cylindrical portion 2f. The notch 2i is provided so that when a returning member 16a of a bail-flipping mechanism 16 that returns the bail arm 40 into the line-retrieving posture is put in during assembly, the fore end 16b of the return member 16a is dodged. That is, the outer surface of the cylindrical portion 2f front end is disposed more outside than the diametric location of the return member 16a fore-end 16b. The reason therefore is that if there were no notch 2i, the return member 16a when put in during assembly would strike the front rim, which would not enable the return member 16a fore-end 16b to be positioned deep into the cylindrical portion 2f. The return member 16b is a wire element the contour of which is bent at either end in opposite directions, and the fore end 16b is rounded. A restrainer 77 is fitted diametrically outward of the spool, along the middle, straight region. The restrainer 77 is fitted within a first rotor arm 31, and is furnished to check deformation of the return member 16a in the spool diametrically outward direction.

A channel portion 2h, which is D-shaped when viewed in cross-section, is formed on the rear end, at a slightly smaller diameter than, the rest of the cylindrical portion 2f. A ring-shaped rotor-braking member 17a made from an elastic body on which the fore end 16b of the return member 16a can contact, is fitted into the channel portion 2h. The area on the rear face of the channel portion 2h where the cover member 2d is mounted communicates with and opens onto the aperture 2c.

A second flange portion 2g that is shaped into an approximately semicircular contour consisting of the chord and circular arc from the missing section of the first flange portion 2e is formed at the front end of the cover member 2d. A water-proofing seal 81 made from an elastic body is fitted into the surface of the second flange portion 2g where it contacts the first flange portion 2e and the rear surface of the cylindrical portion 2f, for sealing the gaps therewith. The waterproofing seal 81 is formed into an approximately semicircular continuous band shape, extending from the front surface to the rear surface of the second flange portion 2g, and opposing the surface where the second flange portion 2g contacts the first flange portion 2e and the surface where the second flange portion 2g contacts the rear surface of the channel portion 2h. The waterproofing seal 81 is fitted into an approximately semicircular arcuate mounting groove 81a formed on the front face of the second flange portion 2g. The rear face of the cylindrical portion 2f is formed with a draft for knockout, so that the cylindrical portion 2f may be drawn from the mold when the reel body 2a and the rod-mounting leg 2b are unitarily molded. Again, the second flange portion 2g of the cover member 2d is likewise formed with a knockout-draft. Accordingly, the second flange portion 2g of the cover member 2d is unlikely to form a seal with the rear face of the cylindrical portion 2f, because the knockout-drafts leave a gap between the second flange portion 2g and the cylindrical portion 2f, which is why the waterproofing seal 81 is installed. Further, a returning nub 17b of the bail-flipping mechanism 16 is fitted detachably/reattachably in an interstice between the first flange portion 2e and the second flange portion 2g. The returning nub 17b is a component for returning the bail arm 40 into the line-winding posture by coming into contact with the return member 16a.

Figure 4:
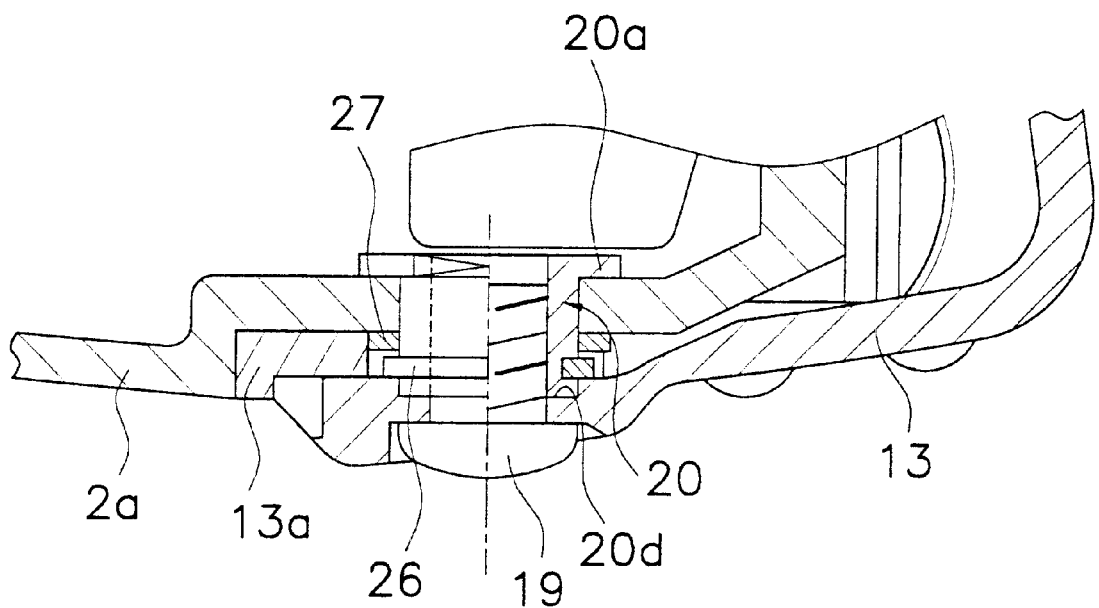
FIG. 4 is a fragmentary cross sectional view of the rear end of the reel unit.

As shown in FIGS. 2 and 3, the rear of the reel unit 2 is covered by a protective cap 13 made from, e.g., metal or a synthetic polymer. The protective cap 13 is disposed to cover the reel unit 2 at the lower part and rear surface, and extends from beneath the reel body 2a and the cover member 2d across the back surface and further to the rod-mounting leg 2b. The protective cap 13 is detachably/reattachably fastened in two places by machine screws 18, 19 to the rear and lower part of the reel unit 2. The upper-end machine screw 18 is an M3(JIS) machine screw, and is screwed directly into the rear surface of the rod-mounting leg of the reel unit 2. The lower-end machine screw 19 is an M2(JIS) machine screw, and as shown in FIG. 4, is screwed into a nut member 20 detachably/reattachably fitted into the lower part of the reel body 2a.

Figure 5:
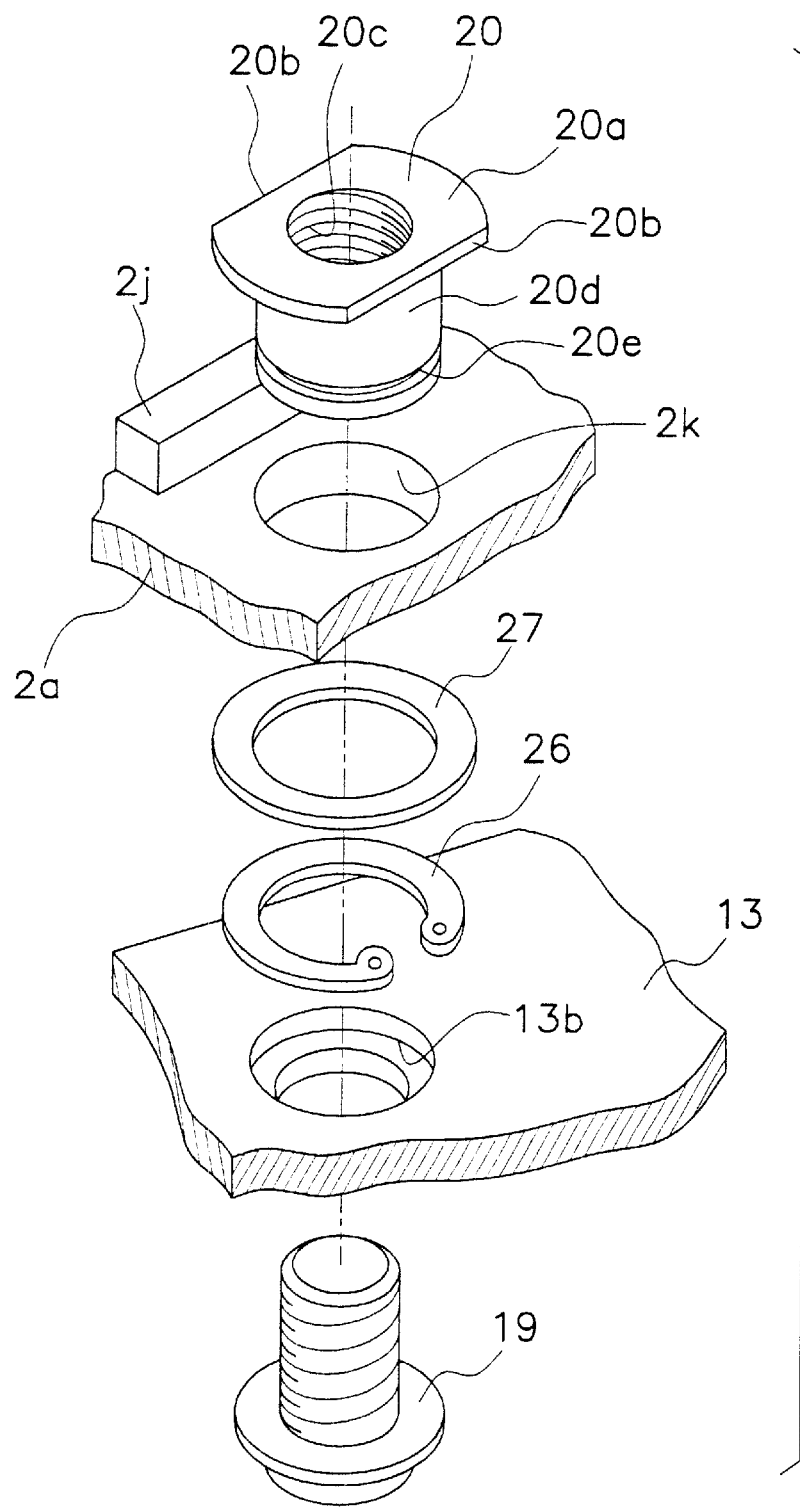
FIG. 5 is an exploded perspective view that explains the procedure of fixing protective cap to the reel unit.

The nut member 20 is an aluminum-alloy circular cylindrical component having a brim 20a. As shown in FIG. 5, chamfers 20b for interlocking with a turn-stop protuberance 2j formed on the lower part of the reel body 2a are formed parallel to each other on the brim 20a of the nut member 20. Female threads 20c are formed in the inner peripheral surface of the nut member 20; the female threads 20c screw-join with the machine screw 19. Fitted in place, the nut member 20 is non-rotatable with respect to the reel body 2a. Further, an annular retaining-ring groove 20e, into which fits a snap ring 26 for locking in place, is formed in the lower-end of the cylinder portion 20d of the nut member 20. The cylinder portion 20d is fitted into a through-hole 2k formed in the lower part of the reel body 2a. The through-hole 2k is positioned opposing a screw-mounting hole 13b formed in the lower part of the protective cap 13.

An insulating ring 27 is fitted in between the snap ring 26 and the protective cap 13 with the nut member 20 mounted in place. The insulating ring 27 is provided to insulate the reel body 2a from the protective cap 13 to prevent electrolytic corrosion when the protective cap 13 is made of metal.

In this configuration, the nut member 20 is fitted into the through-hole 2k until the brim 20a contacts the reel body 2a, and after fitting on the insulating ring 27, the snap ring 26 is attached. One of the chamfers 20c formed on the brim 20a thereby interlocks with the turn-stop protuberance 2j, locking the nut member 20 against turning. After fitting the insulating ring 27 onto the cylinder portion 20d projecting in this state from the underside of the reel body 2a, the snap ring 26 is fitted into the retaining-ring groove 20e. The nut member 20 is thereby locked in place and axially immobilized.

As shown in FIG. 3, a spacer 13a made of a synthetic resin is interposed between the protective cap 13 and the reel unit 2. The spacer 13a is interposed to fill in the gap between the protective cap 13 and the reel unit 2, and to prevent electrolytic corrosion by insulating wherein the protective cap 13 is made of metal. Even if the protective cap 13 is manufactured from a synthetic polymer, clearance variations due to manufacturing discrepancies can be absorbed by thus interposing the spacer 13a.

The protective cap 13 is fitted to the reel unit 2 after attaching the cover member 2d to the reel body 2a. At this time, the upper-end machine screw 18 is screwed fast directly into the rod-mounting leg 2b. Meanwhile, the smaller-diameter, lower-end machine screw 19 is fitted into the nut member 20. Fitting the machine screw 19 into the nut member 20 clasps the brim 20a tightly to the reel body 2a, and fits the protective cap 13 onto the reel unit 2.

Rotor-Drive Mechanism Configuration

As shown in FIG. 2, the rotor drive mechanism includes a master gear 11 into which the handle assembly 1 is non-rotatably fitted, and a pinion gear 12 that meshes with the master gear 11.

The master gear 11 is a face gear formed unitarily with a master-gear shaft 10. The master-gear shaft 10 is a hollow component made of, e.g., stainless steel, through the center of which an interlocking hole 10a into which the handle assembly 1 interlocks is formed. Both ends of the master gear shaft 10 are rotatively supported via bearings in the reel body 2a and the lid member 2d.

The pinion gear 12 is a cylindrical component, running in the front-to-rear direction as shown in FIG. 2, and is fitted rotatively in the reel body 2a. The front portion 12a of the pinion gear 12 passes through the center part of the rotor 3, and by means of a nut 33 is fastened with the rotor 3 where it passes through. The pinion gear 12 is rotatively supported via respective bearings 14a, 14b in the reel body 2a at the mid-portion and rear end in the axial direction. A spool shaft 15 passes through the interior of the pinion gear 12. Along with meshing with the master gear 11, the pinion gear 12 via the linking mechanism 7 also meshes with the oscillation mechanism 6.

Oscillating Mechanism Configuration

The oscillating mechanism 6, as shown in FIG. 2, has a threaded shaft 21 disposed beneath and parallel to the spool shaft 15, a slider 22 that reciprocates along the threaded shaft 21, and an intermediate gear 23 fixed to the fore end of the threaded shaft 21. The slider 22 is movably supported on two vertical guide shafts 24, 24 that are disposed in parallel with the threaded shaft 21. The hind end of the spool shaft 15 is non-rotatably fixed to the slider 22. The intermediate gear 23 meshes with the pinion gear 12 via the linking mechanism 7.

Figure 6:
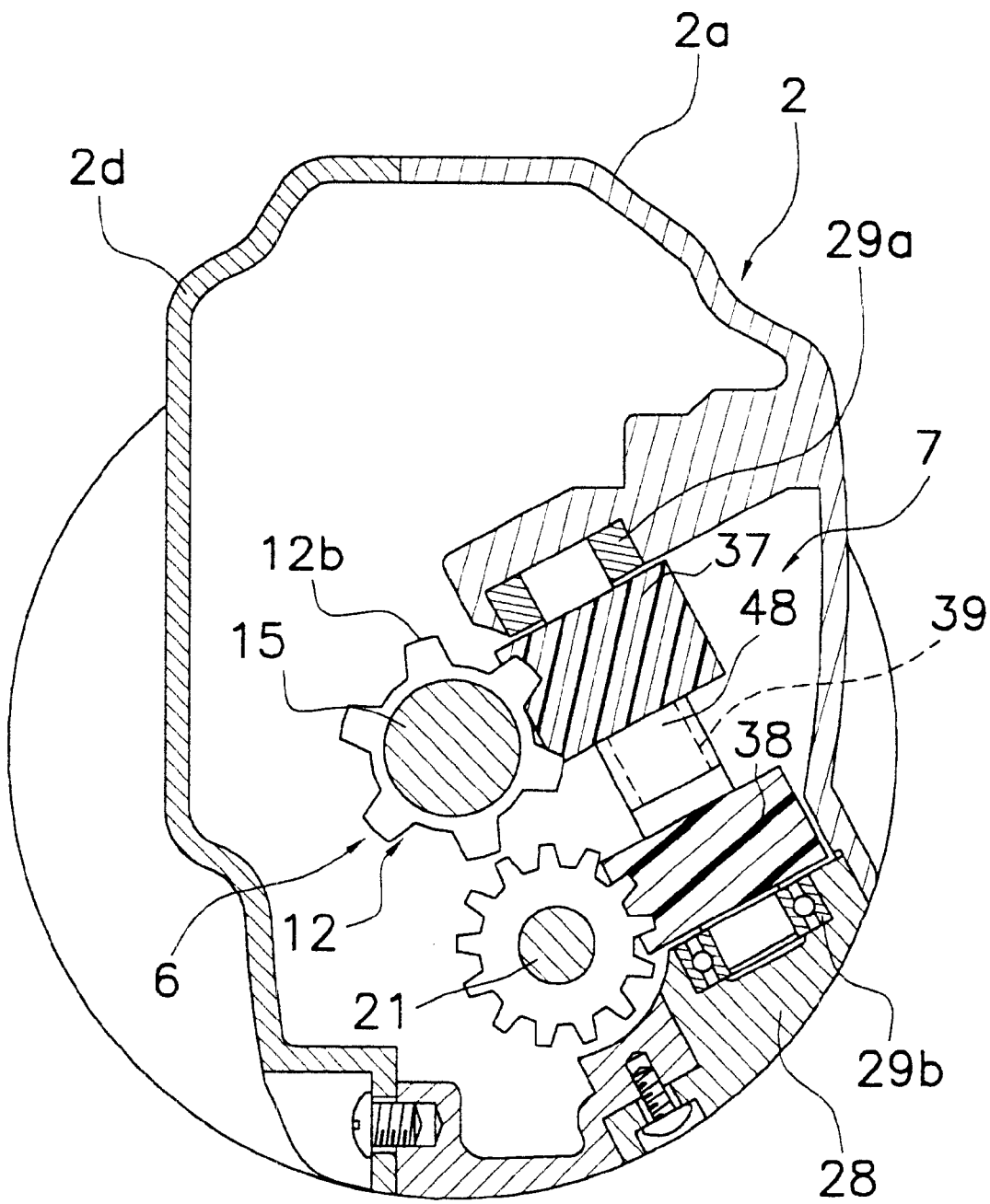
FIG. 6 is a transverse section view of the link mechanism.

The linking mechanism 7 has, as shown in FIG. 6: a first gear 37 that meshes with the pinion gear 12; a second gear 38 that meshes with the intermediate gear 23; and a linking shaft 39 that couples the two gears 37, 38. The linking shaft 39 is disposed diagonally in the front of the reel body 2a. The two ends of the linking shaft 39 are rotatively supported by the reel body 2a and a cap 28 via bearings 29a, 29b. The cap 28 is detachably and reattachably fitted to the bottom of the reel body 2a.

Figure 7:
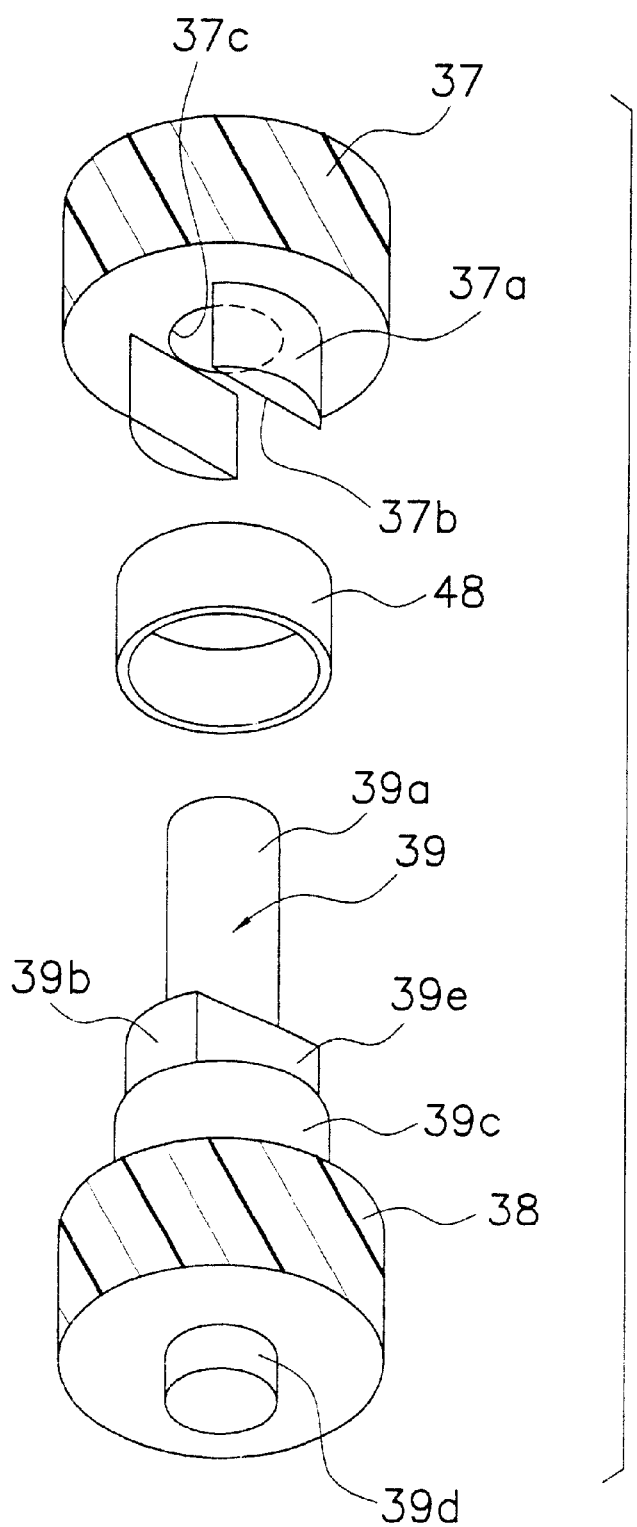
FIG. 7 is an exploded perspective view of the link mechanism.

As shown in FIG. 7, the second gear 38 is formed unitarily with the linking shaft 39. The linking shaft 39, from the FIG.

7 upper part, is formed with: a smaller-diameter first pivot portion 39a; an interlocking portion 39b diametrically larger than the first pivot portion 39a; an intermediate portion 39c diametrically larger than the interlocking portion 39b; the second gear 38; and a second pivot portion 39d. The interlocking portion 39b, which is for interlocking non-rotatably with the first gear 37, is formed with paralleling interlock chamfers 39e. The first gear 37 is formed with tangs 37a of about the same diameter as the interlocking portion 39b, and a through-hole 37c for the first pivot portion 39a to pass through. Mutually parallel portions of the tangs 37a form a slit 37b, into which the chamfers 39e interlock by insertion along the slit 37b inner faces, which fits the first gear 37 non-rotatably to the linking shaft 39. A sleeve 48 is fitted on the circumferential periphery of the tangs 37a. The inner diameter of the sleeve 48 is about the same as the outer diameter of the tangs 37a, and the outer diameter is about the same as the outer diameter of the intermediate portion 39c. The sleeve 48 fit in place keeps the strength of the tangs 37a from deteriorating despite the provision of the slit 37b, and prevents the slit 37b from spreading open though torque acts on the linking shaft 39.

Rotor Configuration

The rotor 3 includes a round cylinder portion 30 fastened to the pinion gear 12; first and second rotor arms 31, 32 opposing each other furnished sideways on the round cylinder portion 30; and a bail arm 40 that guides fishing line onto the spool 4. The round cylinder portion 30 and the two rotor arms 31, 32 are, e.g., aluminum-alloy manufactured, and are formed unitarily.

Figure 8:
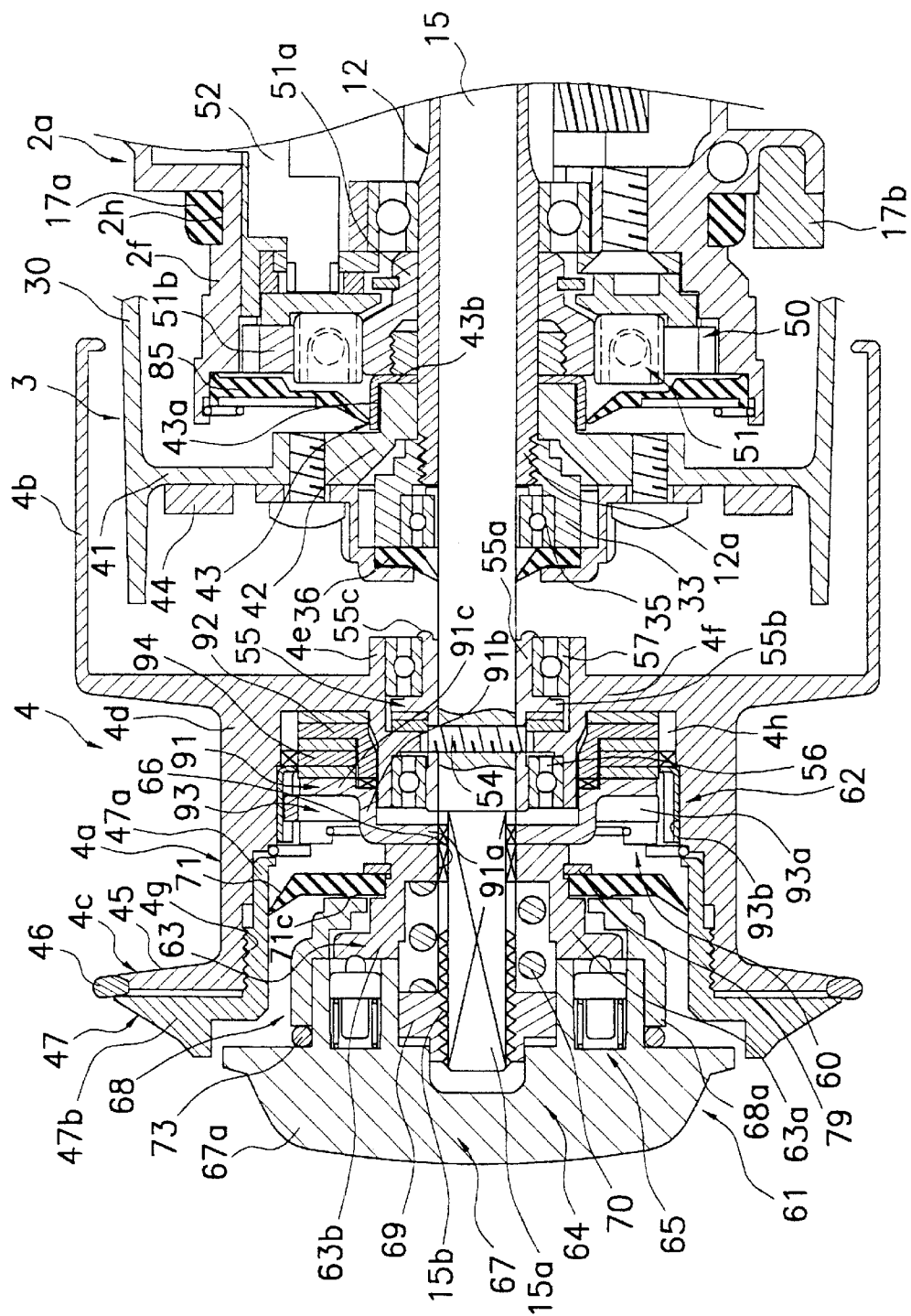
FIG. 8 is a fragmentary sectional view through the spool and rotor center portion.

As shown in FIG. 8, a front wall 41 is formed on the front of the round cylinder portion 30, and a rearward-projecting boss 42 is formed in the center portion of the front wall 41. A through-hole into which the pinion gear 12 is non-rotatably interlocked is formed in the center of the boss 42; the front portion 12a of the pinion gear 12 and the spool shaft 15 penetrate the through-hole.

The nut 33 is screwed onto the front portion 12a of the pinion gear 12, and thus the rotor 3 is fastened non-rotatably to the fore end of the pinion gear 12 by the nut 33. A bearing 35 is disposed along the inner periphery of the nut 33. The bearing 35 is furnished to secure the clearance between the spool shaft 15 and the inner surface of the pinion gear 12. A seal element 36 having a lip along its inner periphery is fitted onto the front face of the nut 33 and the bearing 35. The distal edge of the seal element 36 contacts on the spool shaft 15. This prevents liquids from permeating into the interior of the reel unit 2 from the spool shaft 15.

The aforementioned anti-reverse mechanism 50 is disposed neighboring the boss 42. As shown in FIG. 2, the anti-reverse mechanism 50 includes the one-way clutch 51, and a switching mechanism 52 that switches the one-way clutch 51 between an actuated state (reverse-prohibited state) and an non-actuated state (reverse-permitted state).

An inner race 51a of the one-way clutch 51, which is a roller-type one-way clutch whose inner race is free-rotating, is fitted non-rotatably to the pinion gear 12, and the outer race 51b is fitted non-rotatably into the cylindrical portion 2f. A spacer 43 made of stainless steel alloy interposes between the inner race 51a and the boss 42 on the rotor 3, as shown in FIG. 8. The spacer 43 is a thin round cylindrical component having a cylinder portion 43a and a disk portion 43b; the cylinder portion 43a is fit onto the outer periphery of the boss 42, while the disk portion 43b is sandwiched between the front-end face of the inner race 51a and the boss 42.

In the cylindrical portion 2f interior, a shaft seal 85 having a lip is fitted frontward of the one-way clutch 51. The distal-edge lip of the shaft seal 85 contacts the outer peripheral surface of the cylinder portion 43a of the spacer 43. Herein, liquids are not likely to invade along the inner periphery of the spacer 43, because the disk portion 43b is sandwiched between the boss 42 and the inner race 51a. Accordingly, sealing the outer circumferential surface of the spacer 43 alone can keep liquids from invading the interior of the cylindrical portion 2f. Herein, the spacer 43 is installed because the shaft seal 85 would not form a good seal if the shaft seal 85 were brought directly into contact with the boss 42, unless the rotor 3 is centered properly when the rotor 3 is fastened to the pinion gear 12. Thus, by mounting the spacer 43 and centering it with the shaft seal 85 in advance, the sealing ability of the shaft seal 85 can be secured.

As shown in FIG. 2, the switching mechanism 52 has a stopper shaft 53. The stopper shaft 53 is mounted on the reel body 2a to pivot between a non-operational posture and an operational posture. The stopper shaft 53 includes: a stopper knob 53a that passes through and projects rearward from the reel body 2a and the protective cap 13 to allow operation; a shaft 53b fixed to the stopper knob 53a; and a cam 53c fixed to the tip of the shaft 53b.

As shown in FIG. 3, the stopper knob 53a is removably/reattachably fixed to the shaft 53b by means of an Allen set-screw 58. Herein, the stopper knob 53a is made removable from/reattachable to the shaft 53b because the stopper knob 53a must be taken off when the protective cap 13 is taken off in order to undo the lid member 2d. Using the Allen set-screw 58 for fastening the stopper knob 53a keeps fishing line from getting caught, without sinking the screw head in a hole.

The cam 53c is toggle-urged between the non-operational posture and the operational posture by means of a toggle-spring mechanism 59. The tip of the cam 53c engages with the one-way clutch 51, and is configured such that the one-way clutch 51 is switched between non-operational posture and an operational posture by the stopper shaft 53 pivoting.

Spool Configuration

The spool 4 has, as shown in FIG. 2, a standard type spool whose front-flange outer diameter is large relative to the outer diameter of the bobbin trunk, and is disposed between the first rotor arm 31 and the second rotor arm 32 of the rotor 3. The spool 4 is linked to the fore end of the spool shaft 15 via a drag mechanism 60. The spool 4 includes: a bobbin trunk 4a made, e.g., of a lightweight aluminum alloy, circumferentially onto which fishing line is wound; a skirt 4b that is integrally formed on the rear of the bobbin trunk 4a; and a front flange 4c established on the front end of the bobbin trunk 4a.

The bobbin trunk 4a has, as shown in FIG. 8: a line-winding outer drum portion 4d disposed as the outer periphery; a cylindrical boss portion 4e disposed in the center; and a rear wall portion 4f that connects the outer drum portion 4d and the boss portion 4e. The outer drum portion 4d is constituted by a circumferential surface paralleling the spool shaft 15. The bobbin trunk 4a is mounted, as shown in FIG. 4, rotatively to the spool shaft 15 on two bearings 56, 57 lined one behind the other and fitted inner-circumferentially within the boss 4e.

The bearings 56, 57 are fitted onto the spool shaft 15 via a bearing bushing 55. The bearing bushing 55 is a component fitted non-rotatably, axially immovably to the spool shaft 15. The bearing bushing 55 has a cylindrical portion 55a fitted to the spool shaft 15, and a brim portion 55b formed in the mid-portion axially of the cylindrical portion 55a. The cylindrical portion 55a is attached axially immovably, non-rotatably with respect to the spool shaft 15 by means of a spool pin 54 screwed into the spool shaft 15. A crimped fixing portion 55c for restraining axially rearward movement of the rear-side bearing 57 is formed on the rear end of the cylindrical portion 55. The brim portion 55b is disposed contacting the front-side face of the bearing 57 inner race.

The skirt 4b, a round cylindrical component having a base, flares diametrically from the rear end portion of the bobbin trunk 4a, then extends rearward to cover the round cylinder portion 30 of the rotor 3.

The front flange 4c is furnished for preventing forward line-drop of the fishing line. The front flange 4c includes: an integrally formed first flange portion 45 diametrically outward from the front end portion of the bobbin trunk 4a; and a second flange portion (protection means) 46 that is removably and reattachably mounted onto the first flange portion 45, and whose relative density is larger than the bobbin trunk 4a.

Figure 9:
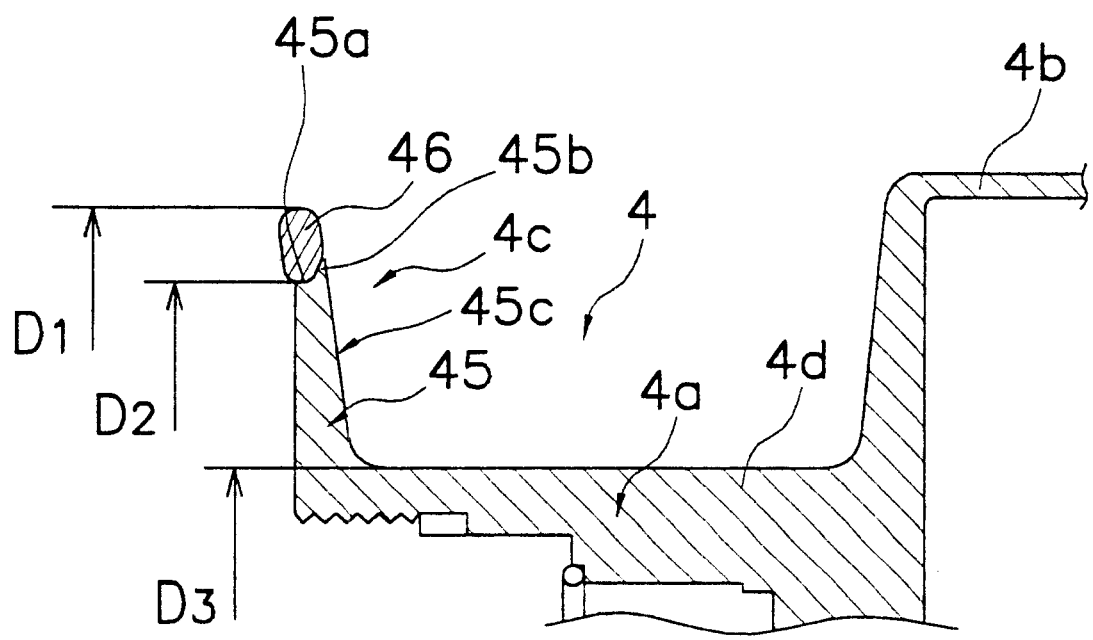
FIG. 9 is a fragmentary sectional view that indicates spool dimensions.

The first flange portion 45 has a fillet section 45c that flares diametrically outward from the front end of outer drum portion 4d of the bobbin trunk 4a. The fillet section 45c is rectilinear when viewed in a cross-section in the spool axial direction. The front-end side of the circumferential periphery of the first flange portion 45 is formed paralleling the spool shaft 15, and the rear-end side is formed projecting diametrically outwardly. Referring to FIG. 9, a paralleling surface 45a of the first flange 45 contacts the inner peripheral surface and restrains diametric movement of the second flange portion 46. A projecting portion 45b of the first flange 45 contacts the inner peripheral rear-end surface and restrains rearward shifting of the second flange portion 46.

The second flange portion 46 is a component made of a hard material—e.g., a hard metal such as stainless steel or a hard ceramic manufacture such as zirconia—whose relative density is larger than that of the first flange portion 45. A flange-fastening member (fastening means) 47 screwed into the inner peripheral surface of the bobbin trunk 4a fastens the second flange portion 46 to the first flange portion 45. As clearly shown in FIG. 8, an outer diameter of the flange-fastening 47 is roughly the same as that of the first flange portion 45. Also, the difference between the inner diameter and the outer diameter of the second flange portion 46 is much less than the half of the difference between the outer diameter of the second flange portion 46 and the bobbin trunk 4a. Also, the second flange portion 46 has an almost oval cross sectional shape. The circumferential rim of the second flange portion 46 has a rounded, forward-leaning contour—a contour over which fishing line readily slips forward.

As shown in FIG. 9, the outer diameter D2 of the first flange portion 45 is greater than the mid-value $[(D1+D3)/2]$ between the outer diameter D1 of the second flange portion 46 and the outer diameter D3 of the bobbin trunk 4a $[D2 \geq (D1+D3)/2]$. Further, the inner-outer difference in the second flange portion 46 diameters is in the range of 3 mm–25 mm. If the outer diameter D2 of the first flange portion 45 were less than the mid-value $[(D1+D3)/2]$ between the outer diameter D1 of the second flange portion 46 and the outer diameter D3 of the bobbin trunk 4a, the proportion that the lightweight second flange portion 46 occupies of the entire front flange 4c overall would be smaller, which would not likely serve to lighten the weight. An inner-outer difference of less than 3 mm in the second flange portion 46 diameters would make the second flange portion 46 too narrow and of insufficient strength. Again, if the inner-outer difference is in excess of 25 mm, the proportion of the front flange 4c in which the second flange portion 46 having a large relative-density would occupy would be great, making the entire spool oversized and leading to weight increase in the spool overall.

By dividing the front flange 4c into two sections in this way and disposing the second flange portion 46, which is made of a hard material whose relative density is large, as the outer peripheral section subject to scratching where the fishing line rubs, and by disposing as the remaining inner peripheral section the smaller-relative-density first flange portion 45 that is unitarily formed with the bobbin trunk 4a, wear resistance and durability in the front flange 4c are maintained, while making the spool 4 as lightweight as possible.

The flange-fastening member 47 includes: a cylindrical mounting portion 47a that screws into female threads 4g formed in the fore-end inner circumferential surface of the outer drum portion 4d of the bobbin trunk 4a; and a brim portion 47b extending diametrically outward from the fore end of the mounting portion 47a. With the rear end face along the circumferential periphery of the brim portion 47b pressing on the second flange portion 46, the flange-fastening member 47 fastens the second flange portion to the first flange portion 45.

Drag Mechanism Configuration

The drag mechanism 60 is mounted between the spool 4 and the spool shaft 15, and is a device for applying drag force to the spool 4. The drag mechanism 60 has, as shown in FIG. 8: a knob unit 61 for adjusting the drag force by hand; and a friction unit 62 made up of a plurality of disks that are pressed toward the spool 4 by means of the knob unit 61.

Chamfers 15a are formed parallel with each other frontward of the bearing bushing 55 on the spool shaft 15, and male threads 15b are formed on the fore end of the portion with the chamfers 15a. The knob unit 61 includes: a first component 63 installed non-rotatably yet axially movably on the chamfers 15a; a second component 64 disposed axially frontward of the first component 63 and screwed onto the spool shaft 15; and a sounding mechanism 65 fitted in between the first component 63 and the second component 64.

The first component 63 is a round cylindrical member having a brim, and includes a cylinder portion 63a and a ring-shaped brim portion 63b that is larger in diameter than the cylinder portion 63a. A flat-sided keyway 66 into which the spool shaft 15 non-rotatably interlocks is formed in the inner margin of the cylinder portion 63a. The rear end face on the cylinder portion 63a of the first component 63 abuts on the friction unit 62. A sealing washer 71 for preventing liquids from invading toward the friction unit 62 from outside is fitted between the cylinder portion 63a of the first component 63 and the inner circumferential surface of the drum section inside the bobbin trunk 4a. The sealing washer 71 is a sealing component having a lip on the outer periphery and obtained, e.g., by "outsert"-molding a plate-shaped elastic element made of NBR onto the circumferential perimeter of ring element made of stainless steel. The sealing washer 71 is urged leftward as seen in FIG. 8 by a snap ring 79. A ring-shaped protrusion 71c is formed on the left-hand face of the sealing washer 71 as seen in FIG. 8. This protrusion 71c abuts on a later-described cover member 68 to prevent liquids from invading along the inner peripheral margin.

The second component 64 is installed against the first component 63, yet is permitted to rotate relative to the first component 63. The second component 64 includes: a knob body 67 disposed aligned frontward of the first component 63 in the spool shaft 15 direction; and the cover member 68, whose fore end is fixed to the outer periphery of the knob body 67, and in the interior of which the first component 63 is relatively rotatably housed.

The knob body 67 is a saucer-shaped component, the front surface of which forms a forward projecting, roughly trapezoidal knob 67a. A nut 69 that screws onto the male-threaded portion 15b at the tip of the spool shaft 15 is fitted non-rotatably yet axially movably in the interior of the knob body 67. Further, a coil spring 70 is disposed in the compressed state about the outer periphery of the spool shaft 15 in the interval between the first component 63 and the nut 69.

The cover member 68 is a cylindrical component having a stepped base, through which base the round cylinder portion 63a of the first component 63 passes. Further, the protrusion 71c on the sealing washer 71 abuts on the base. A cylinder portion 68a of the cover member 68 is screw-stopped onto the outer circumferential surface of the knob body 67.

An O-ring 73 is fitted in between the knob body 67 and the fore end of the cylinder portion 68a of the cover member 68. The O-ring 73 is an elastic element made, e.g., of NBR, and is provided in order to prevent liquids from invading the interior from the clearance between the first component 63 and the knob body 67 of the second component 64. Once liquid invades through this clearance, even though the sealing washer 71 is provided, water might encroach through the clearance between the first component 63 and the spool shaft 15 and as far as up to the friction unit 62. The friction portion 62 might then get wet, altering the drag force.

Figure 10:
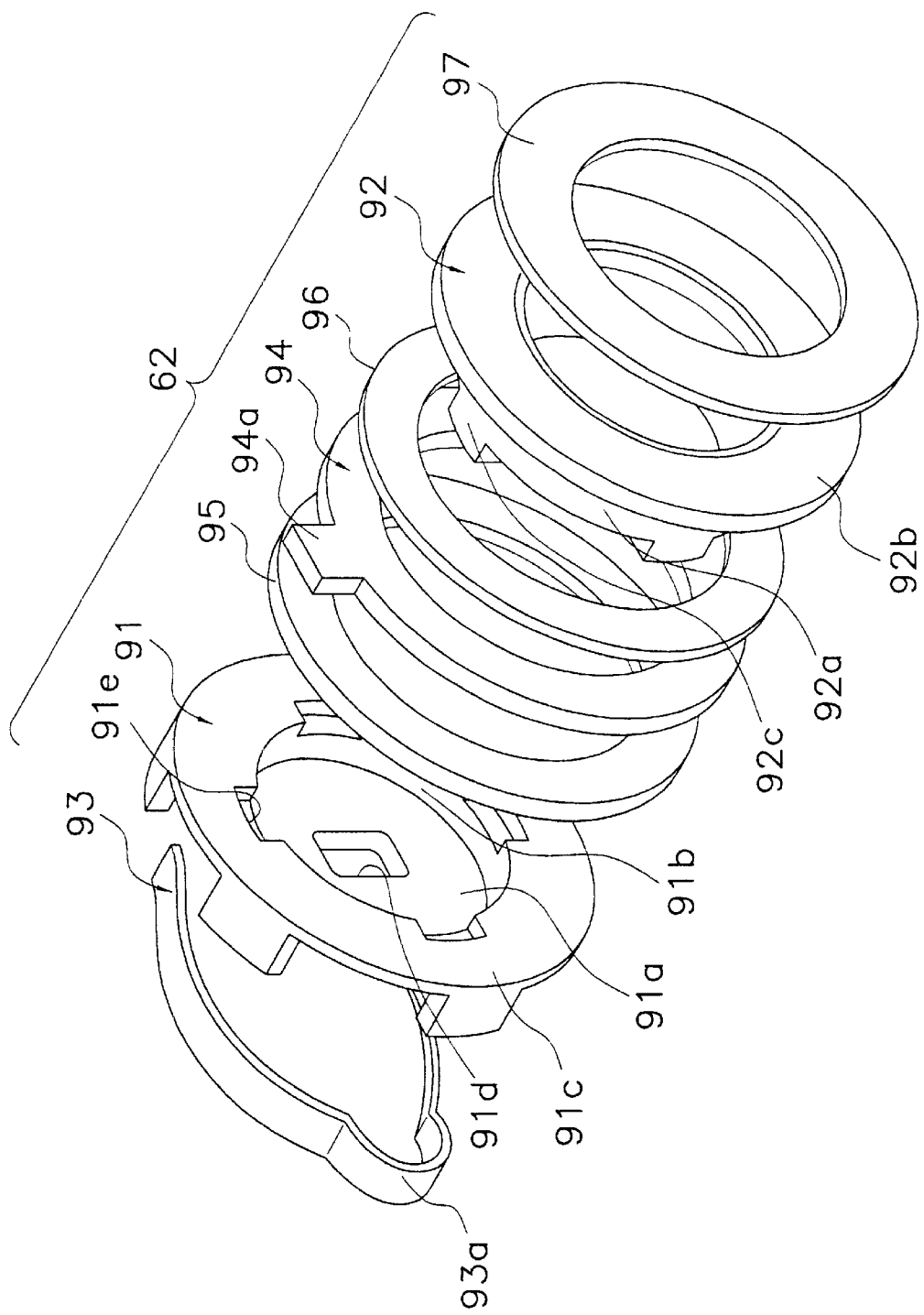
FIG. 10 is an exploded perspective view of a drag-mechanism friction unit.

The friction unit 62 includes, as shown in FIGS. 8 and 10: a first disk 91 that contacts the first component 63; a second disk 92 non-rotatably interlocked into the first disk 91; a third disk 94 arranged in between the first disk 91 and the second disk 92; and a drag sounding mechanism 93 fitted to the first disk 91.

The first disk 91 has: an inner disk portion 91a; a circular cylinder portion 91b that extends rearward from the circumferential periphery of the inner disk portion 91a, along the outer periphery of the boss portion 4e of the bobbin trunk 4a; and an outer disk portion 91c that extends diametrically outward from the rear end of the circular cylinder portion 91b. The first disk 91 is fitted non-rotatably yet axially movably to the spool shaft 15 by interlocking the portion with the chamfers 15a into a roughly rectangular interlocking hole 91d formed in the center of the inner disk portion 91a. Four, for example, round arcuate recesses 91e are formed spaced at circumferential intervals on the inner peripheral margin of the back face of the first-disk 91 outer disk portion 91c.

The second disk 92, a round cylindrical component with a brim, has a cylinder portion 92a and a brim portion 92b. The cylinder portion 92a is disposed encompassing the boss portion 4e, and fitted letting it rotate on the boss portion 4e. Four tongues 92c are formed spaced at circumferential intervals, projecting from the fore end of the cylinder portion 92a. The tongues 92c interlock into the round arcuate recesses 91e. The second disk 92 is thereby interlocked non-rotatably into the first disk 91. Accordingly, the second disk 92 is also non-rotatable with respect to the spool shaft 5.

The third disk 94 is fitted rotatively about the outer peripheral surface of the cylinder portion 92a of the second disk 92. On its circumferential perimeter, the third disk 94 has a pair of interlock tongues 94a (only one being illustrated) that project diametrically outward. The interlock tongues 94a interlock into interlock grooves 4h formed in the inner peripheral surface of the bobbin-trunk 4a outer drum portion 4d. The third disk 94 is thereby let rotate with respect to the spool shaft, yet is non-rotatable with respect to the spool 4.

The drag sounding mechanism 93 includes: a spring element 93a in the form of a bowed and bent over ribbon-shaped metal plate; and a serrated element 93b (shown in FIG. 8) made of metal, which is mounted on the inner peripheral surface of the outer drum portion 4d. The spring element 93a is interlocked into the first disk 91, making it non-rotatable with respect to the spool shaft 15. During drag operation, that is, when the spool 4 rotates with respect to the spool shaft 15, the bent-over crest of the spring element 93a repeatedly collides with the serrated element 93b made of metal, issuing sound.

Drag washers 95, 96, 97 made of graphite or felt are, respectively, fitted: between the first disk 91 and the third disk 94, between the third disk 94 and the second disk 92, and between the second disk 92 and the rear wall portion 4f of the bobbin trunk 4a.

Reel Handling and Operation

With this spinning reel, when the line is to be reeled out during casting or the like, the bail arm 40 is flipped over into the line-releasing posture. Consequently, the fishing line is reeled out successively from the leading-edge side of the spool 4 by the terminal tackle under its own weight. In this situation, the fact that the front flange 4c is divided into two sections—with the second flange portion 46, which is manufactured of a hard material having relatively large density and is arranged on the outer peripheral area that is prone to scratching due to the rubbing by the fishing line, maintains wear resistance and durability in the front flange 4c.

During line retrieval, the bail arm 40 is returned into the line-retrieving posture. This automatically takes place by the operation of a not-illustrated bail-flipping mechanism when the handle assembly 1 is rotated in the line-retrieving direction. The handle assembly 1 torque is transmitted to the pinion gear 12 via the master-gear shaft 10 and the master gear 11. The torque transmitted to the pinion gear 12 is transmitted from its front portion 12a to the rotor 3, and meanwhile is transmitted via the gear-down train to the oscillating mechanism 6 by the intermediate gear 23 that meshes with the pinion gear 12. Consequently, along with the rotor 3 rotating in the line-retrieving direction, the spool 4 pumps back and forth.

In the course of fishing, there are times when waves splash on the reel and the reel gets wet. Because the sealing washer 71 and the O-ring 73 are fitted in the drag mechanism 60, water is not apt to encroach from the front or rear to the friction unit 62. Therefore, once the drag force is adjusted, fluctuations in the drag force due to water soaking in will be scarce.

Furthermore, furnishing the waterproofing seal 81 between the cover member 2d and the reel body 2a prevents liquids from invading into the interior mechanism-mounting space. This keeps seawater and the like from entering the interior, making it unlikely that crystalline deposits of salt will form on the gears, guide sections and inside the bearings.

Other Embodiments (a) A front-drag type spinning reel was illustrated as an example in the foregoing embodiment, but the present invention is applicable to spools in all types of spinning reels, such as: drag-type spinning reels, spinning reels that do not have a drag, and lever-drag type spinning reels.

(b) The second flange portion 46 is fastened to the first flange portion 45 by the flange-fastening member 47 in the foregoing embodiment, but may be fastened by suitable fastening means such as an adhesive or crimping. Furthermore, by making the first flange portion 45 of a synthetic resin polymer, the second flange portion 46 may fixed into the first flange portion 45 by insert-molding.

(c) The bobbin trunk 4a is made of an aluminum alloy in the foregoing embodiment, but may be made of another lightweight alloy such as magnesium alloy, or may be manufactured from a synthetic resin polymer. In that case, a thin metal film may be formed on the surface of the synthetic resin.

(d) The first flange portion 45 is formed unitarily with the bobbin trunk 4a in the foregoing embodiment, but they may be separate members. If so, the first flange portion 45 only needs to have a relative density smaller than that of the second flange portion 46.

Figure 11:
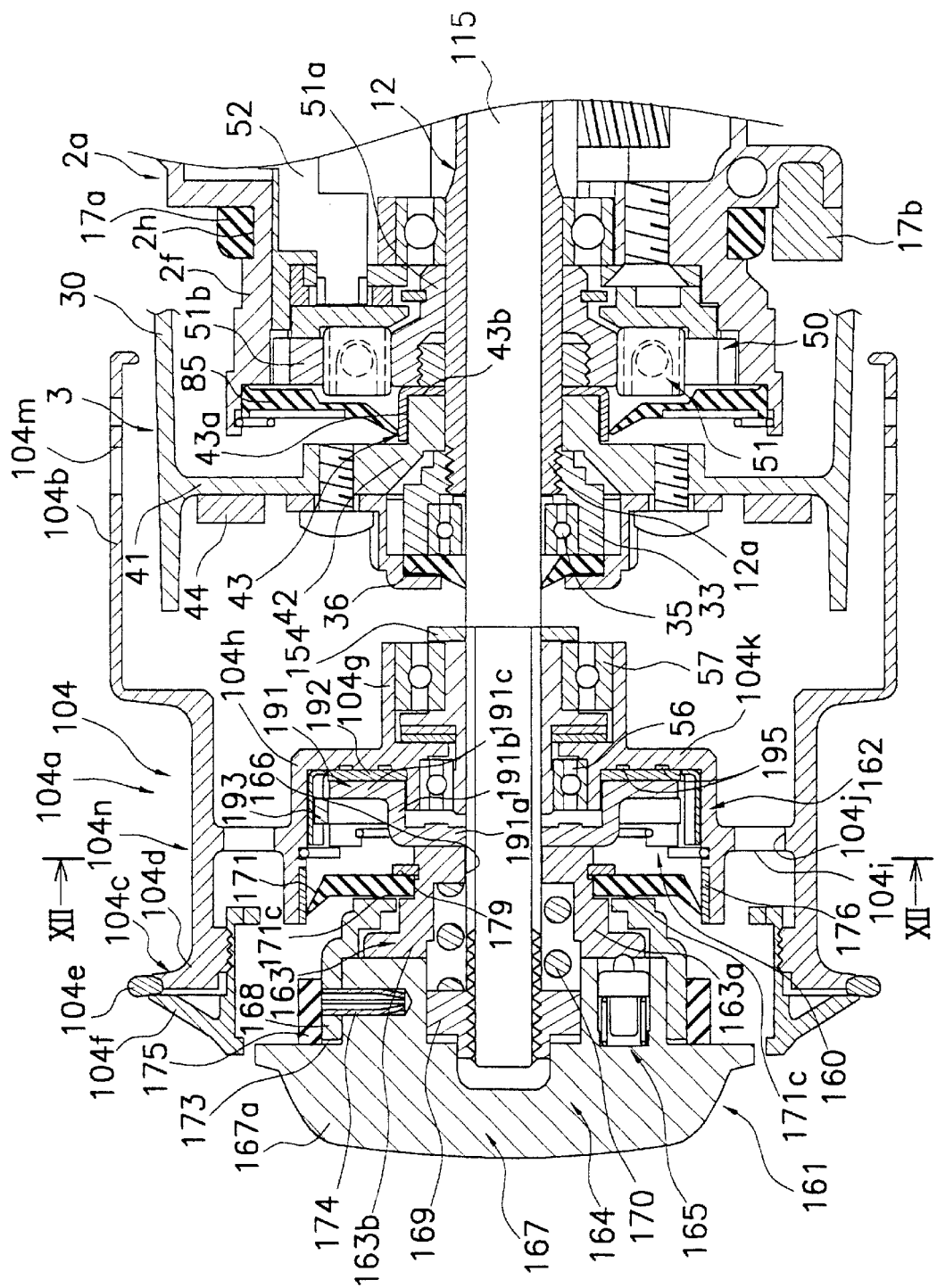
FIG. 11 is a fragmentary sectional view of the spool and the rotor center portion corresponding to FIG. 8 in accordance with another embodiment.

(e) The spool 104 may be a shallow-groove type spool as shown in FIG. 11. The spool 104 is cold-forged, made from an aluminum alloy, and is disposed between the first rotor arm 31 and the second rotor arm 32 of the rotor 3. The spool 104 is linked to the fore end of the spool shaft 115 via a drag mechanism 160. The spool 104 includes: a bobbin trunk 104a circumferentially onto which fishing line is wound; a skirt 104b that is integrally formed on the rear of the bobbin trunk 104a; and a front flange 104c established on the front end of the bobbin trunk 104a.

Figure 12:
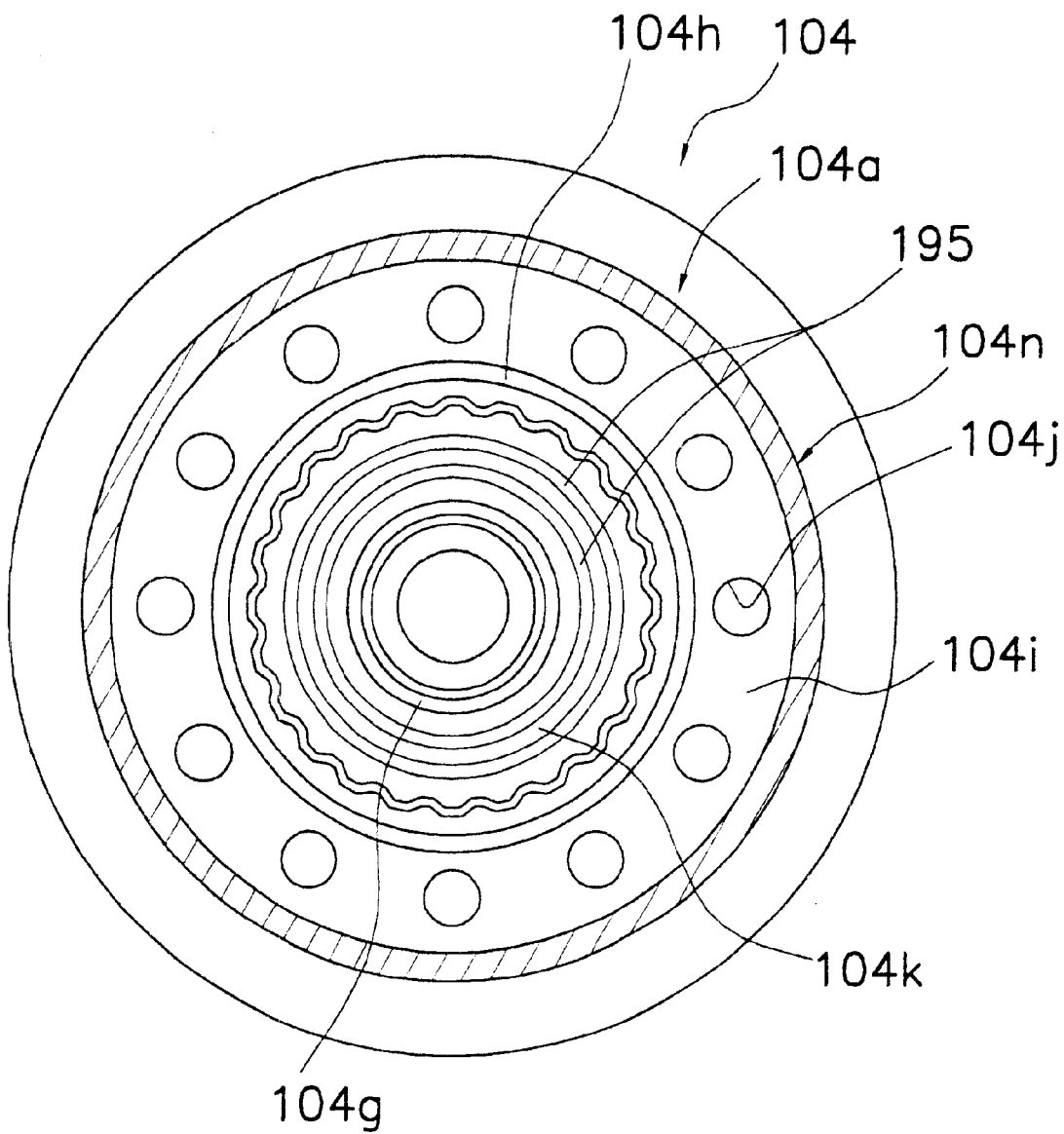
FIG. 12 is a sectional view of the spool taken on the line XII—XII in FIG. 11.

The bobbin trunk 104a, as shown in FIGS. 11 and 12, a roughly triple-tiered circular cylindrical component having an outer peripheral portion 104n, a cylindrical boss 104g in the center, and a cylindrical drag housing 104h disposed between the bobbin trunk 104a and the outer periphery of the boss 104g. The outer peripheral portion 104n of the bobbin trunk 104a is configured as circumferentially parallel with the spool shaft 115. The bobbin trunk 104a, as shown in FIG. 11, is rotatively mounted on the spool shaft 115 by means of two bearings 56, 57 fitted in the boss 104g. A number of circular perforations 104j is formed at circumferentially spaced intervals in a wall 104i that joins the drag housing 104h and the outer peripheral portion 104n. The perforations 104j serve to lighten the bobbin trunk 104a while maintaining its strength. Further, two concentrically situated annular grooves 195 for improving drag performance are formed in the front face of a wall 104k that joins the drag housing 104h and the boss 104g.

The skirt 104b, a round cylindrical component having a base, flares diametrically from the rear end portion of the bobbin trunk 104a, then extends rearward. Perforations 104m are also formed in the rear of the skirt 104b to lighten the weight and improve the design.

The flange 104c includes: an integrally formed rise portion 104d diametrically outward from the front end portion of the bobbin trunk 104a; and a ring 104e made of metal or ceramic, detachably/reattachably mounted onto the rise portion 104d. A flange-fastening member 104f screwed into the inner peripheral surface of the bobbin trunk 104a fastens the ring 104e to the rise portion 104d.

A locating washer 154 fitted onto the spool shaft 115 abuts on and positions the spool 104.

Drag Mechanism Configuration

The drag mechanism 160 is mounted between the spool 104 and the spool shaft 115, and is a device for applying drag force to the spool 104. The drag mechanism 160 has, as shown in FIG. 11: a knob 161 for adjusting the drag force by hand; and a friction unit 162 made up of a plurality of disks that are pressed toward the spool 104 by means of the knob 161.

The knob 161 includes: a first member 163 installed non-rotatably yet axially movably on the spool shaft 115; a second member 164 disposed axially frontward of the first member 163 and screwed onto the spool shaft 115; and a sounding mechanism 165 fitted in between the first member 163 and the second member 164.

The first member 163 is a round cylindrical member having a brim, and includes a cylinder portion 163a and a ring-shaped brim portion 163b larger in diameter than the cylinder portion 163a. A flat-sided keyway 166 into which the spool shaft 115 non-rotatably interlocks is formed in the inner margin of the cylinder portion 163a. The rear end face on the cylinder portion 163a of the first member 163 abuts on the friction unit 162. A sealing washer 171 for preventing liquids from invading toward the friction unit 162 is fitted between the cylinder portion 163a of the first member 163 and, along the inside of the bobbin trunk 104a, the drag housing 104h inner circumferential surface. The sealing washer 171 is a sealing member having a lip on the outer periphery and obtained, e.g., by outsert-molding a plate-shaped elastic element made of NBR onto the circumferential perimeter of ring element made of stainless steel. The sealing washer 171 is urged leftward as seen in FIG. 11 by a snap ring 179. A ring-shaped protrusion 171c is formed on the left-hand side of the sealing washer 171 as seen in FIG. 11. This protrusion 171c abuts on a later-described cover member 168 to prevent liquids from invading along the inner margin. The lip of the sealing washer 171 abuts on a seat element 176 set tightly into the inner circumferential surface of the drag housing 104h. The seat element 176 is a component whose inner peripheral surface is precision-machined; putting the lip into contact with the inner peripheral surface of the seat element 176 in this manner improves the sealing performance.

The second component 164 is installed against the first component 163, yet is permitted to rotate relative to the first component 163. The second component 164 includes: a knob unit 167 disposed aligned frontward of the first component 163 in the spool shaft 115 direction; and the cover member 168, whose fore end is fixed to the outer periphery of the knob unit 167, and in the interior of which the first component 163 is relatively rotatably housed.

The knob unit 167 is a saucer-shaped component, the front surface of which forms a forward projecting, roughly trapezoidal knob 167a. A nut 169 that screws onto the tip of the spool shaft 115 is fitted non-rotatably yet axially movably in the interior of the knob unit 167. Further, a coil spring 170 is disposed in the compressed state about the outer periphery of the spool shaft 115 in the interval between the first component 163 and the nut 169.

The cover member 168 is a cylindrical member having a stepped base, through which base the round cylinder portion 163a of the first member 163 passes. Further, the protrusion 171c on the sealing washer 171 abuts on the base. A cylinder portion 168a of the cover member 168 is fastened onto the outer circumferential surface of the knob unit 167 by, e.g., two spring pins 174. Hollow spring pins 174 of this sort may be taken off by inserting a needle-shaped metal jig that catches on them through the center hole. A sealing band 175 is fitted encompassing the lead ends of the spring pins 174 to hold the spring pins 174 in place and prevent liquids from invading through the fore-end outer periphery of the cover member 168. The sealing band 175 is an annular part made of an elastic body that is rectangular in cross section, and is fitted on in a slightly stretched state.

The friction unit 162 includes a disk 191 that contacts the first member 163, a drag-sounding mechanism 193 fitted to the disk 191, and the disk-shaped wall 104k of the spool 104. The disk 191 has: an inner disk portion 191a; a circular cylinder portion 191b that extends rearward from the circumferential periphery of the inner disk portion 191a; and an outer disk portion 191c that extends diametrically outward from the rear end of the round cylinder portion 191b. The inner disk portion 191a is interlocked with the spool shaft 115, whereby the disk 191 is non-rotatable with respect to the spool shaft 115. Further, the drag-sounding mechanism 193 is fitted to the outer disk portion 191c, which meanwhile is contiguous with the front face of the wall 104k via a drag washer 192 made of graphite. During relative rotation between the spool shaft 115 and the spool 104, i.e., during drag operation, the drag-sounding mechanism 193 issues sound.

Because two annular grooves 195 are formed in the wall 104k in the drag mechanism configured in this way, the coefficient of static friction and the coefficient of kinetic friction become closer in value, whereby the established drag performance is manifested with stability. In other words, if the static friction coefficient and the kinetic friction coefficient differed greatly, the drag force when the drag starts into effect would be on the order of 30–60% greater than the drag force thereafter. By furnishing the annular grooves 195, that value is held down to the range of 10–20%.

Effects of Invention

Under the present invention, the front flange is divided into two sections, with the second flange portion that is made of a hard material having relatively large density, and arranged on the outer peripheral area prone to scratching due to rubbing by the fishing line; and the first flange portion that has relatively small density, and arranged in the remaining inner peripheral area. Therefore, wear resistance and durability in the front flange can be maintained, while lightening the spool as much as possible.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A spool for a spinning reel for line winding, fitted onto a fore end portion of a spool shaft for reciprocating back and forth relative to a reel body of the spinning reel, said spool comprising:
    a bobbin trunk fitted onto the fore end portion of the spool shaft;
    a front flange having
        a first flange portion provided as a brim encompassing a fore end of said bobbin trunk, and
        a ring-shaped second flange portion fitted removably and reattachably onto an outer periphery of said first flange portion and made of a hard material whose relative density is larger than those of said bobbin trunk and said first flange portion, a difference between an inner diameter and an outer diameter of said second flange portion being smaller than half of a difference between the outer diameter of said second flange portion and an outer diameter of said bobbin trunk; and
    a flange-fastening member for fastening said second flange portion onto said first flange portion.

2. The spool set forth in claim 1, wherein said first flange portion is formed unitarily with said bobbin trunk.

3. The spool set forth in claim 1, further comprising
a skirt larger in diameter than said bobbin trunk and formed unitarily with a rear end of said bobbin trunk.

4. The spool set forth in claim 3, wherein
said skirt has a plurality of perforations formed thereon.

5. The spool set forth in claim 1, wherein
an outer diameter of said first flange portion is larger than
    a mid-value between the outer diameter of said second flange portion and the outer diameter of said bobbin trunk.

6. The spool set forth in claim 1, wherein
a difference between the inner diameter and the outer diameter of said second flange portion is 3 mm–25 mm.

7. The spool set forth in claim 1, wherein
said first flange portion has a section that is rectilinear in
    a cross-section viewed from a direction perpendicular to a direction of the spool shaft.

8. The spool set forth in claim 1, wherein
said flange-fastening member is fastened by screwing into an inner peripheral surface of said bobbin-trunk.

9. The spool set forth in claim 1, wherein
said bobbin trunk includes
    an outer peripheral portion,
    a cylindrical boss,
    a drag housing disposed radially between said cylindrical boss and said outer peripheral portion, and
    a wall joining said drag housing and said outer peripheral portion.

10. The spool set forth in claim 9, wherein
said wall has a plurality of perforations formed thereon.

11. The spool set forth in claim 1, wherein
said second flange portion has a substantially oval cross-sectional shape.

12. A spinning reel for use with a fishing rod, comprising:
a reel body attachable to the fishing rod;
a handle assembly rotatably fitted to said reel body;
a rotor attached to a fore portion of said reel body and rotatable in accordance with rotation of said handle assembly;

a spool shaft extending in a fore-rear direction; and a spool fitted onto a fore end portion of said spool shaft for reciprocating back and forth along said spool shaft relative to said reel body, said spool including a bobbin trunk fitted onto said fore end portion of said spool shaft;

a front flange having a first flange portion provided as a brim encompassing a fore end of said bobbin trunk, and a ring-shaped second flange portion fitted removably and reattachably onto an outer periphery of said first flange portion and made of a hard material whose relative density is larger than those of said bobbin trunk and said first flange portion, a difference between an inner diameter and an outer diameter of said second flange portion being smaller than half of a difference between the outer diameter of said second flange portion and an outer diameter of said bobbin trunk; and a flange-fastening member for fastening said second flange portion onto said first flange portion.

13. The spinning reel set forth in claim 12, wherein said first flange portion is formed unitarily with said bobbin trunk.

14. The spinning reel set forth in claim 12, wherein said spool further includes a skirt larger in diameter than said bobbin trunk and formed unitarily with a rear end of said bobbin trunk.

15. The spinning reel set forth in claim 12, wherein an outer diameter of said first flange portion is larger than a mid-value between the outer diameter of said second flange portion and the outer diameter of said bobbin trunk.

16. The spinning reel set forth in claim 12, wherein a difference between the inner diameter and the outer diameter of said second flange portion is 3 mm–25 mm.

17. The spinning-reel spool set forth in claim 12, wherein said first flange portion has a section that is rectilinear in a cross-section viewed from a direction perpendicular to a direction of said spool shaft.

18. The spinning-reel spool set forth in claim 12, wherein said flange-fastening member is fastened by screwing into an inner peripheral surface of said bobbin-trunk.

19. A spool for a spinning reel for line winding, fitted onto a fore end portion of a spool shaft for reciprocating back and forth relative to a reel body of the spinning reel, said spool comprising:

a bobbin trunk fitted onto the fore end portion of the spool shaft;

a front flange having a flange portion provided as a brim encompassing a fore end of said bobbin trunk, and protection means for protecting an outer periphery of said flange portion, said protection means being removable from and reattachable to said outer periphery of said flange portion; and fastening means for removably and reattachably fastening said protection means onto said flange portion, an outer diameter of said fastening means and an outer diameter of said flange portion being substantially the same.

20. A spool for a spinning reel for line winding, fitted onto a fore end portion of a spool shaft for reciprocating back and forth relative to a reel body of the spinning reel, said spool comprising:

a bobbin trunk fitted onto the fore end portion of the spool shaft;

a front flange having a first flange portion provided as a brim encompassing a fore end of said bobbin trunk, and a ring-shaped second flange portion fitted removably and reattachably onto an outer periphery of said first flange portion and made of a hard material whose relative density is larger than those of said bobbin trunk and said first flange; and a flange-fastening member for fastening said second flange portion onto said first flange portion, an outer diameter of said flange-fastening member and an outer diameter of said first flange portion being substantially the same.

21. The spool set forth in claim 20, wherein a difference between an inner diameter and the outer diameter of said second flange portion is 3 mm–25 mm.

22. The spool set forth in claim 20, wherein said first flange portion has a section that is rectilinear in a cross-section viewed from a direction perpendicular to a direction of the spool shaft.

* * * * *